(12) United States Patent
Ramamoorthy et al.

(10) Patent No.: US 12,167,494 B2
(45) Date of Patent: Dec. 10, 2024

(54) SYSTEMS AND METHODS FOR SUPPORTING AD HOC GROUP CALL FOR MCX SERVICES

(71) Applicant: SAMSUNG ELECTRONICS CO., LTD., Suwon-si (KR)

(72) Inventors: Arunprasath Ramamoorthy, Bangalore (IN); Basavaraj Jayawant Pattan, Bangalore (IN); Kiran Gurudev Kapale, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 195 days.

(21) Appl. No.: 17/660,537

(22) Filed: Apr. 25, 2022

(65) Prior Publication Data

US 2022/0346184 A1    Oct. 27, 2022

(30) Foreign Application Priority Data

Apr. 26, 2021  (IN) .............................. 202141019166
Mar. 31, 2022  (IN) ............................... 20214109166

(51) Int. Cl.
H04W 76/10    (2018.01)
H04W 4/10     (2009.01)
H04W 76/45    (2018.01)
H04L 65/4038  (2022.01)

(52) U.S. Cl.
CPC ............ *H04W 76/45* (2018.02); *H04W 4/10* (2013.01); *H04W 76/10* (2018.02); *H04L 65/4038* (2013.01)

(58) Field of Classification Search
CPC ....... H04W 76/45; H04W 76/10; H04W 4/10; H04L 65/4038
See application file for complete search history.

(56) References Cited

U.S. PATENT DOCUMENTS

| | | | | |
|---|---|---|---|---|
| 9,510,166 B1* | 11/2016 | Allen | ..................... | H04W 4/08 |
| 9,628,965 B2* | 4/2017 | Allen | ..................... | H04W 4/08 |
| 10,499,245 B2* | 12/2019 | Rajadurai | ........... | H04L 65/1073 |
| 10,506,660 B2* | 12/2019 | Kim | ..................... | H04W 24/04 |
| 10,587,656 B2* | 3/2020 | Kim | ................... | H04L 61/5014 |
| 10,708,783 B2* | 7/2020 | Rajadurai | ........... | H04L 65/1073 |
| 10,715,968 B2* | 7/2020 | Ko | ...................... | H04L 41/0803 |
| 10,834,541 B2* | 11/2020 | Wu | ........................ | H04W 4/10 |
| 11,564,087 B2* | 1/2023 | Ben Henda | ........... | H04W 12/03 |

(Continued)

OTHER PUBLICATIONS

Nokia et al., "MCData user config update with the limit on emergency groups accepted per FA", Change Request, 3GPP TSG-CT WG1 Meeting #128-e, Feb. 25-Mar. 5, 2021, C1-212583, 25 pages.

(Continued)

*Primary Examiner* — Hai V Nguyen

(57) ABSTRACT

The disclosure relates to a 5G or 6G communication system for supporting a higher data transmission rate. Embodiments herein disclose methods and systems for providing support for ad hoc group calls in mission critical services. The method includes listing, by an MCPTT client, a list of MCPTT participants or a functional alias to initiate an ad hoc group call in a MCX on network. The method further includes initiating, by the MCPTT client, the ad hoc group call with a list of MCPTT participants or the functional alias by sending a group call request to an MCPTT server.

19 Claims, 5 Drawing Sheets

(56) References Cited

U.S. PATENT DOCUMENTS

| | | | | |
|---|---|---|---|---|
| 11,659,361 | B2* | 5/2023 | Kapale | H04W 12/08 |
| | | | | 455/518 |
| 2016/0344726 | A1* | 11/2016 | Stojanovski | H04W 12/0431 |
| 2017/0070868 | A1* | 3/2017 | Allen | H04L 65/4061 |
| 2017/0134444 | A1* | 5/2017 | Buckley | H04L 9/3271 |
| 2017/0289776 | A1* | 10/2017 | Kim | H04W 4/10 |
| 2018/0020336 | A1* | 1/2018 | Gupta | H04M 3/20 |
| 2018/0103364 | A1 | 4/2018 | Gholmieh et al. | |
| 2018/0124578 | A1* | 5/2018 | Sedlacek | H04W 4/10 |
| 2018/0124604 | A1* | 5/2018 | Rajadurai | H04W 12/086 |
| 2018/0220270 | A1* | 8/2018 | Wu | H04W 4/10 |
| 2018/0234465 | A1* | 8/2018 | Kim | H04L 61/5014 |
| 2018/0270891 | A1* | 9/2018 | Kim | H04W 36/0022 |
| 2019/0007803 | A1* | 1/2019 | Sedlacek | H04W 12/106 |
| 2019/0335328 | A1* | 10/2019 | Ben Henda | H04W 12/04 |
| 2020/0120504 | A1* | 4/2020 | Rajadurai | H04L 65/1073 |
| 2021/0044940 | A1* | 2/2021 | Wu | H04W 4/10 |
| 2022/0053298 | A1* | 2/2022 | Kapale | H04W 12/08 |
| 2023/0247391 | A1* | 8/2023 | Kapale | H04L 65/1063 |
| | | | | 455/518 |
| 2023/0379679 | A1* | 11/2023 | Kapale | H04W 4/70 |

OTHER PUBLICATIONS

Samsung, "Authorized user being notified about other users floor queue status", Change Request, 3GPP TSG-SA WG6 Meeting #39-bis-e, Oct. 12-20, 2020, S6-202006, 13 pages.

Huawei et al., "Clarification on security for preconfigured regroup", Change Request, 3GPP TSG-SA WG6 Meeting #42-bis-e, Apr. 12-20, 2021, S6-210902, 2 pages.

International Search Report dated Aug. 4, 2022 in connection with International Patent Application No. PCT/KR2022/005881, 4 pages.

Written Opinion of the International Searching Authority dated Aug. 4, 2022 in connection with International Patent Application No. PCT/KR2022/005881, 4 pages.

Intellectual Property India, "Examination Report under sections 12&13 of the Patents Act," dated Nov. 16, 2022., in connection with Indian Patent Application No. 202141019166, 7 pages.

Supplementary European Search Report dated Jun. 26, 2024, in connection with European Patent Application No. 22796077.0, 12 pages.

3GPP TS 23.379 V17.5.0 (Dec. 2020); Technical Specification; 3rd Generation Partnership Project; Technical Specification Group Services and System Aspects; Functional architecture and information flows to support Mission Critical Push To Talk (MCPTT); Stage 2 (Release 17); 250 pages.

* cited by examiner

SYSTEMS AND METHODS FOR SUPPORTING AD HOC GROUP CALL FOR MCX SERVICES

CROSS REFERENCE TO RELATED APPLICATIONS

This application is based on and claims priority under 35 U.S.C. § 119(a) to Indian Provisional Patent Application Serial No. 202141019166 (PS), filed Apr. 26, 2021, and Indian Complete Patent Application Serial No. 202141019166 (CS), filed on Mar. 31, 2022, in the Indian Intellectual Property Office, the disclosures of which are incorporated herein by reference in their entireties.

BACKGROUND

1. Field

Embodiments disclosed herein relate to mission critical (MC) services (MCX) and more particularly to providing support of ad hoc group calls for MCX.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

With the existing specifications, the $3^{rd}$ generation partnership project (3GPP) standard specification, TS 23.280 and TS 23.379, a MC User may be able to perform a group call by merging two or more existing pre-configured groups or by selecting one or more users who are to be invited for the group call. This functionality requires a new temporary group to be formed either at the group management server or at the mission critical services (MCX) server before a call is made to that group. This newly created temporary group is persisted at the group management server or at the MCX server until the group is deleted by the MCX user.

There is no procedure existing currently, through which the MCX user can select the list of users and perform a MCX operation without involving the intermediary step of forming a temporary group.

The principal object of the embodiments herein is to disclose methods and systems for providing support for ad hoc group calls in mission critical services, wherein a MCX user can select the list of users and perform a MCX operation without involving the intermediary step of forming a temporary group.

SUMMARY

Accordingly, the embodiments herein provide a method for providing ad hoc group calls in mission critical services (MCX). The method includes listing, by a mission critical push to talk (MCPTT) client, a list of MCPTT participants or a functional alias to initiate an ad hoc group call in a MCX on network. The method further includes initiating, by the MCPTT client, the ad hoc group call with a list of MCPTT participants or the functional alias by sending a group call request to a MCPTT server. The method further includes generating, by the MCPTT client, ad hoc group ID to be used for the ad hoc group call. The method further includes receiving, by the MCPTT participants, a notification of an incoming ad hoc group call with the ad hoc group ID from the MCPTT server, wherein the incoming ad hoc group call is initiated by the MCPTT client. The method further includes sending, by the MCPTT participants, group call responses to the MCPTT server for accepting the ad hoc group call. The method further includes establishing, by the participating MCPTT clients, a media plane and at least one floor control resource to be used in the ad hoc group call.

Embodiments herein further disclose checking, by the MCPTT server, whether the MCPTT client can initiate the ad hoc group call before sending the group call request to the MCPTT participants based on preset configuration parameters.

Embodiments herein further disclose automatically adding, by the MCPTT client, at least one mandatory MCPTT participant into the ad hoc group call request as defined in the preset configuration parameters Embodiments herein further disclose that the method includes automatically adding, by the MCPTT server, at least one mandatory MCPTT participant into the ad hoc group call request as defined in the preset configuration parameters and if the mandatory participant is not added by the MCPTT client.

Embodiments herein further disclose that the method includes resolving, by the MCPTT server, the functional alias into the list of MCPTT participants on receiving the ad group call with functional alias as target and sending the ad hoc group call request to those participants.

Embodiments herein further disclose initiating, by the MCPTT client, the ad hoc call with the MCPTT participants for off-network case.

Embodiments herein further disclose selecting, by the MCPTT Client, a ProSe layer-2 group ID from a pool of configured ProSe layer-2 group IDs. Announcing, by the MCPTT Client, an ad hoc group information comprising corresponding ProSe layer-2 group ID to the MCPTT participants or the functional alias within a PC5 communication of a PC5 channel dedicated for announcing ad hoc group communication. Receiving, by the MCPTT client, a PC5 communication parameters corresponding to the ad hoc group. Invoking, by the MC client, the ad hoc group call set up procedures in off network mode.

Embodiments herein further disclose that the MCPTT client, the MCPTT server, and the MCPTT participants are configured with MCPTT configuration parameters.

In one aspect, the embodiments herein is to provide an MCPTT client for providing ad hoc group calls in MCX. The MCPTT client includes a memory, at least one processor, a MCX controller connected with the memory and the at least one processor is configured to list a list of MCPTT participants or a functional alias to initiate an ad hoc group call in a MCX on network. The MCX controller is further configured to initiate the ad hoc group call with a list of MCPTT participants or the functional alias by sending a group call request to a MCPTT server. The MCX controller is further configured to generate ad hoc group ID to be used for the ad hoc group call. The MCX controller is further configured to establish a media plane and at least one floor control resource to be used in the ad hoc group call.

In another aspect, the embodiments herein is to provide an MCPTT server for providing ad hoc group calls in MCX. The MCPTT server includes a memory, at least one processor, a MCX controller connected with the memory and the at least one processor is configured to receive an incoming ad hoc group call request from a MCPTT client. The MCX controller is further configured to send a notification of the incoming ad hoc group call request with an ad hoc group ID to MCPTT participants. The MCX controller is further configured to receive a group call acceptance response from the MCPTT participants.

Embodiments herein further disclose that the MCX controller is further configured to check whether the MCPTT client (102) can initiate the ad hoc group call, before sending the group call request to the MCPTT participants based on preset configuration parameters.

Embodiments herein further disclose that the MCX controller is further configured to automatically add at least one mandatory MCPTT participant into the ad hoc group call request as defined in the preset configuration parameters and if the mandatory participant is not added by the MCPTT client.

Embodiments herein further disclose that the MCX controller is further configured to resolve the functional alias into the list of MCPTT participants on receiving the ad group call with functional alias as target and sending the ad hoc group call request to those participants.

In yet another aspect, the embodiments herein provide a method for providing ad hoc group calls in MCX. The method includes listing, by an MCPTT client, a list of MCPTT participants or a functional alias to initiate an ad hoc group call in a MCX on network. The method further includes initiating, by the MCPTT client, the ad hoc group call with a list of MCPTT participants or the functional alias by sending a group call request to a MCPTT server. The method further includes generating, by the MCPTT client, ad hoc group ID to be used for the ad hoc group call. The method further includes selecting, by the MCPTT client, a ProSe layer-2 group ID from a pool of configured ProSe layer-2 Group IDs. The method further includes announcing, by the MCPTT Client, an ad hoc group information comprising corresponding ProSe layer-2 group ID to the MCPTT participants or the functional alias within a PC5 communication of a PC5 channel dedicated for announcing ad hoc group communication. The method further includes receiving, by the MCPTT client, a PC5 communication parameters corresponding to the ad hoc group. The method further includes invoking, by the MC client, the ad hoc group call set up procedures in off network mode.

Embodiments herein further disclose automatically adding, by the MCPTT client, at least one mandatory MCPTT participant into the ad hoc group request if the MCPTT participant is defined in the preset configuration parameters.

Embodiments herein further disclose initiating, by the MCPTT client, the ad hoc call with the MCPTT participants for off-network case.

In yet another aspect, the embodiments herein provide a system for providing ad hoc group calls in MCX. The system includes an MCPTT server, a MCPTT client, and MCPTT participants. Each of the MCPTT server, the MCPTT client, and the MCPTT participants includes a memory; at least one processor; a MCX controller connected with the memory and the at least one processor is configured to: list a list of MCPTT participants or a functional alias to initiate an ad hoc group call in a MCX on network. The MCX controller is further configured to initiate the ad hoc group call with a list of MCPTT participants or the functional alias by sending a group call request to a MCPTT server. The MCX controller is further configured to generate ad hoc group ID to be used for the ad hoc group call. The MCX controller is further configured to receive a notification of an incoming ad hoc group call with the ad hoc group ID from the MCPTT server, wherein the incoming ad hoc group call is initiated by the MCPTT client. The MCX controller is further configured to send group call responses to the MCPTT server for accepting the ad hoc group call. The MCX controller is further configured to establishing, by the participating MCPTT clients, a media plane and at least one floor control resource to be used in the ad hoc group call.

Embodiments herein further disclose that the MCX controller is further configured to check whether the MCPTT client can initiate the ad hoc group call, before sending the group call request to the MCPTT participants based on preset configuration parameters.

Embodiments herein further disclose that the MCX controller is further configured to automatically add at least one mandatory MCPTT participant into the ad hoc group request as defined in the preset configuration parameters.

Embodiments herein further disclose that the MCX controller is further configured to automatically add at least one mandatory MCPTT participant into the ad hoc group call request as defined in the preset configuration parameters and if the mandatory not added by the MCPTT client.

Embodiments herein further disclose that the MCX controller is further configured to resolve the functional alias into the list of MCPTT participants on receiving the ad group call with functional alias as target and sending the ad hoc group call request to those participants.

Embodiments herein further disclose that the MCX controller is further configured to initiate the ad hoc call with the MCPTT participants for off-network case.

Embodiments herein further disclose that the MCX controller is further configured to select a ProSe layer-2 group ID from a pool of configured ProSe layer-2 group IDs, announce an ad hoc group information comprising corresponding ProSe layer-2 group ID to the MCPTT participants or the functional alias within a PC5 communication of a PC5 channel dedicated for announcing ad hoc group communication, receive a PC5 communication parameters corresponding to the ad hoc group, and invoke the ad hoc group call set up procedures in off network mode.

Embodiments herein further disclose that the MCPTT client, the MCPTT server, and the MCPTT participants are configured with MCPTT configuration parameters.

These and other aspects of the embodiments herein will be better appreciated and understood when considered in conjunction with the following description and the accompanying drawings. It should be understood, however, that the following descriptions, while indicating at least one embodiment and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The embodiments disclosed herein are illustrated in the accompanying drawings, throughout which like reference letters indicate corresponding parts in the various figures. The embodiments herein will be better understood from the following description with reference to the drawings, in which.

DETAILED DESCRIPTION

Figure 1:
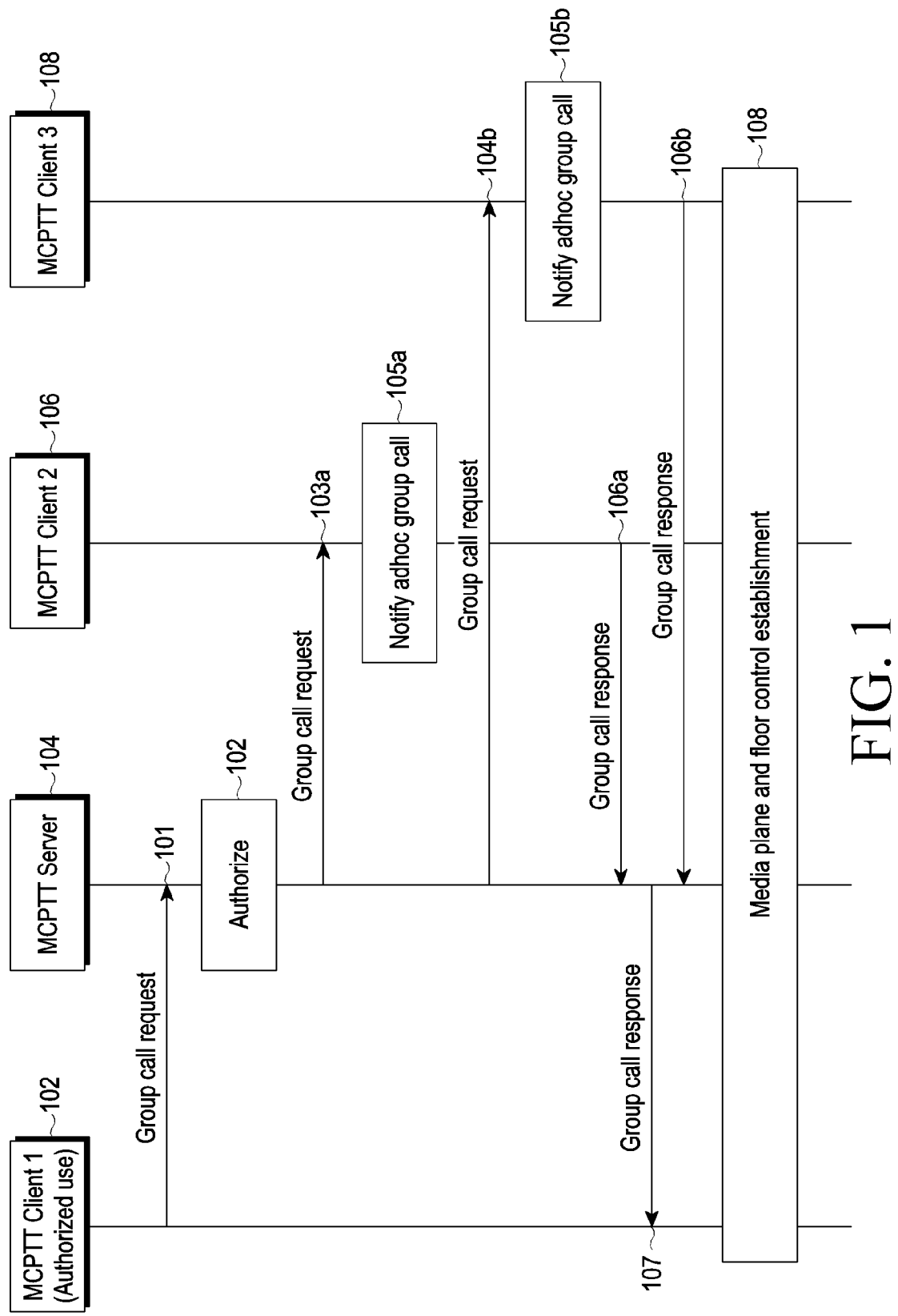
FIG. 1 illustrates an ad hoc group call setup procedure initiated by an authorized user according to embodiments of the present disclosure.

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The embodiments herein achieve methods and systems for providing support for ad hoc group calls in mission critical services. Referring now to the drawings, and more particularly to FIGS. 1 through 5, where similar reference characters denote corresponding features consistently throughout the figures, there are shown at least one embodiment.

An ad hoc group call by definition enables a MCX user to select two or more MCX users in order to perform a MCX operation involving the selected MCX users. Examples of the MCX operation can be, but not limited to, a MCPTT call, a MCVideo call, a MCData related operation, and so on. Embodiments herein consider MCPTT service as an example service and explain the system, procedures and configuration required to support ad hoc group call functionality. Similar procedures are applicable for other Mission critical services to support the ad hoc group call.

Ad hoc group call related configuration.

Following are the list of configurations that are required to support the ad hoc group call functionality.

Maximum number of participants allowed for ad hoc group call.

This configuration allows a MCPTT admin to configure the maximum numbers of participants allowed in an ad hoc group call. A MCPTT server may reject an ad hoc group call request if the number of participants are more than this configured limit. In an embodiment herein, the same limit applies to all the MCPTT users in that domain and this configuration can be part of the MCPTT service configuration data if the same limit applies to all the MCPTT users in that domain. In an embodiment herein, the limit varies across users and the limit can be configured in MCPTT user profile data. Table 1 shows a maximum number of users allowed in an ad hoc call.

TABLE 1

| Parameter description | MCPTT UE | MCPTT Server | Configuration management server | MCPTT user database |
|---|---|---|---|---|
| Maximum number of users allowed in an ad hoc group call | Y | Y | Y | Y |

Whether MCPTT user is authorized to make ad hoc group call.

This configuration decides whether the MCPTT user is allowed to make an ad hoc group call. The MCPTT server uses this parameter to decide whether to accept or reject the ad hoc group call from a user. This configuration resides in the MCPTT User profile data. Table 2 shows an authorization to make an ad hoc group call.

TABLE 2

| Parameter description | MCPTT UE | MCPTT Server | Configuration management server | MCPTT user database |
|---|---|---|---|---|
| Authorized to make an ad hoc group call | Y | Y | Y | Y |

List of MCPTT users who can be invited/called in an ad hoc group call:

This configuration enables the MCPTT admin to configure which MCPTT users are allowed to be called in for the ad hoc group call. The MCPTT user profile data contains the parameter which is applied by the MCPTT server to validate whether the members included in the ad hoc group call request are part of this configuration. If not ad hoc group call may be rejected with appropriate reason. Table 3 shows a list of users who can be called in an ad hoc group call.

TABLE 3

| Parameter description | MCPTT UE | MCPTT Server | Configuration management server | MCPTT user database |
|---|---|---|---|---|
| List of User(s) who can be called in an ad hoc group call | Y | Y | Y | Y |
| >MCPTT ID | Y | Y | Y | Y |
| >User info ID | Y | N | Y | Y |
| >ProSe discovery group ID | Y | N | Y | Y |

List of MCPTT users from which the ad hoc group call can be received.

When an incoming ad hoc group call is received for a MCPTT user, this configuration enables the MCPTT server to validate whether the receiving MCPTT user is allowed to receive ad hoc group call from the calling MCPTT user. This configuration may be part of MCPTT user profile data. Table 4 shows a list of users from which ad hoc group call can be received.

TABLE 4

| Parameter description | MCPTT UE | MCPTT Server | Configuration management server | MCPTT user database |
|---|---|---|---|---|
| List of users from which ad hoc group call can be received | Y | Y | Y | Y |
| >MCPTT ID | Y | Y | Y | Y |

List of functional aliases to which ad hoc group calls are allowed when using a certain functional alias:

This configuration may be part of the MCPTT user profile data and this parameter specifies the list of functional alias which can be called by the MCPTT user in the ad hoc group call when he has activated a certain functional alias. Table 5 shows the list of functional aliases to which ad hoc group calls are allowed when using a certain functional alias.

TABLE 5

| Parameter description | MCPTT UE | MCPTT Server | Configuration management server | MCPTT user database |
|---|---|---|---|---|
| List of functional aliases to which ad hoc group calls are allowed when using a certain functional alias | Y | Y | Y | Y |
| >Used functional alias | Y | Y | Y | Y |
| >>List of functional aliases which can be called | | | | |
| >>>Functional alias | Y | Y | Y | Y |

List of functional alias from which ad hoc group call can be received:

This configuration parameter enables the MCPTT admin to configure the list of functional alias from which ad hoc group call can be received when using certain functional alias. Table 6 shows a list of functional aliases to which ad hoc group calls can be received when using a certain functional alias.

TABLE 6

| Parameter description | MCPTT UE | MCPTT Server | Configuration management server | MCPTT user database |
|---|---|---|---|---|
| List of functional aliases to which ad hoc group calls can be received when using a certain functional alias | Y | Y | Y | Y |

TABLE 6-continued

| Parameter description | MCPTT UE | MCPTT Server | Configuration management server | MCPTT user database |
|---|---|---|---|---|
| >Used functional alias | N | Y | Y | Y |
| >>List of functional aliases from which call can be called | | | | |
| >>>Functional alias | Y | Y | Y | Y |

List of mandatory participants to be included in the Ad hoc group call:

Sometimes it may be required that in an ad hoc group call certain members may be always invited. For e.g., the dispatcher or supervisor to be part of all the ad hoc group call. This configuration lists those MCPTT users who may be part of any ad hoc group call made by the MCPTT user and is part of the MCPTT user profile data document. Table 7 shows a list of MCPTT users who may be mandatorily invited for the ad hoc group call.

TABLE 7

| Parameter description | MCPTT UE | MCPTT Server | Configuration management server | MCPTT user database |
|---|---|---|---|---|
| List of MCPTT users who may be mandatorily invited for the ad hoc group call | Y | Y | Y | Y |
| >MCPTT IDs | Y | Y | Y | Y |

Conditions to start the audio/video transmission for ad hoc group call and termination of ad hoc group call.

Some deployments may choose to have some conditions which needs to be satisfied before starting the audio transmission in an ad hoc group call and also configurations for terminating the ad hoc group call. This configuration is part of the MCPTT user profile document or any other document. These configurations may also be sent as part of the Ad hoc group call request from the client. Table 8 shows several conditions for ad hoc group call.

TABLE 8

| Parameter description | MCPTT UE | MCPTT Server | Configuration management server | MCPTT user database |
|---|---|---|---|---|
| >>Minimum number of group members acknowledging before start of audio transmission | N | Y | Y | Y |
| >>Ad hoc group call hang timer | N | Y | Y | Y |
| >>Minimum number of mandatory participants acknowledging before start of audio transmission | N | Y | Y | Y |
| >>Action upon failure to receive acknowledgement from required group members before call timeout (proceed or abandon) | N | Y | Y | Y |
| >>List of mandatory participants who have to acknowledge before start of audio transmission | | | | |
| >>>MCPTT IDs | N | Y | Y | Y |

Information flows for supporting ad hoc group call.

Table 9 describes the information flow of ad hoc group call request from the MCPTT client 102 to the MCPTT server 104.

TABLE 9

| Information Element | Status | Description |
|---|---|---|
| MCPTT ID | M | The MCPTT ID of the calling party |

TABLE 9-continued

| Information Element | Status | Description |
|---|---|---|
| Functional alias | O | The functional alias of the calling party |
| MCPTT group ID (See NOTE 1) | O | The MCPTT group ID of the group on which the call is requested |
| MCPTT ad hoc group ID (See NOTE 2) | O | The MCPTT group ID which is generated by the MCPTT user to be associated with the ad hoc group call |
| SDP offer | M | Media parameters of MCPTT clients |
| Implicit floor request | O | When originating client requests the floor, this element may be included |
| Broadcast indicator | O | Indicates that the group call request is for a broadcast group call |
| Ad hoc group call indicator | O | Indicates that the group call request of for ad hoc group call. |
| MCPTT ID list (See NOTE 3) | O | The MCPTT ID of users being invited to the ad hoc group call |
| Functional alias (NOTE 3) | O | Functional alias to which ad hoc group call is placed |
| Location information | O | Location of the calling party. |
| Requested priority | O | Application priority level requested for this call |

NOTE 1:
This parameter may be present if the group call request is for the pre-defined group
NOTE 2:
This parameter may be present if the group call request is for ad hoc group call.
NOTE 3:
Either one of these parameters may be present as target for the ad hoc group call Table 10 describes the information flow of ad hoc group call request from the MCPTT client 102 to the MCPTT server 104 when combination of functional alias and MCPTT IDs are used as target for the ad hoc group call.

TABLE 10

| Information Element | Status | Description |
|---|---|---|
| MCPTT ID | M | The MCPTT ID of the calling party |
| Functional alias | O | The functional alias of the calling party |
| MCPTT group ID | O | The MCPTT group ID of the group on which the call is requested |
| MCPTT ad hoc group ID (NOTE 1) | O | The MCPTT group ID which is generated by the MCPTT user to be associated with the ad hoc group call |
| SDP offer | M | Media parameters of MCPTT clients |
| Implicit floor request | O | When originating client requests the floor, this element may be included |
| Broadcast indicator | O | Indicates that the group call request is for a broadcast group call |
| Ad hoc group call indicator | O | Indicates that the group call request of for ad hoc group call. |
| MCPTT ID list (NOTE 2) | O | The MCPTT ID of users being invited to the ad hoc group call |
| Functional alias list (NOTE 2) | O | List of one more functional alias to which ad hoc group call is placed |
| Location information | O | Location of the calling party. |
| Requested priority | O | Application priority level requested for this call |

NOTE 1:
This parameter may be present if the group call request is for ad hoc group call.
NOTE 2:
Either one of these parameter may be present or both of these parameters may be present as target for the ad hoc group call Table 11 describes the information flow of ad hoc group call request from the MCPTT server to the MCPTT client.

TABLE 11

| Information Element | Status | Description |
|---|---|---|
| MCPTT ID | M | The MCPTT ID of the calling party |
| Functional alias | O | The functional alias of the calling party |

TABLE 11-continued

| Information Element | Status | Description |
| --- | --- | --- |
| MCPTT group ID | M | The MCPTT group ID of the group on which the call is initiated |
| SDP offer | M | Media parameters of MCPTT server |
| Broadcast indicator | O | Indicates that the group call request is for a broadcast group call |
| Ad hoc group call indicator | O | Indicates that the group call request is for ad hoc group call |

Procedure for Ad Hoc Group Call.

The ad hoc group call can be initiated by an authorized user inviting a list of MCPTT users. The group ID for this ad hoc group call is generated by the originating MCPTT client 102. The ad hoc group call is terminated by either the MCPTT server releasing the call or the authorized user ending the call. The release of the call may be followed by release of the ad hoc group ID. FIG. 1 illustrates the ad hoc group call setup procedure initiated by an authorized user according to embodiments of the present disclosure.

The pre-conditions are as follows:
 The authorized user is aware of the MCPTT users who may be invited to the ad hoc group call; and
 A group ID to be used for the ad hoc group call is generated by the originating MCPTT client.

In one example of Step 1, the MCPTT client 1 initiates the ad hoc group call by sending the group call request to the MCPTT server. This group call request contains the ad hoc group call indicator set and also the list of MCPTT IDs of the users invited to the call.

In one example of Step 2, the MCPTT server checks whether the MCPTT client 1 can initiate the ad hoc group call.

In one example of Step 3, the MCPTT server sends the group call requests towards the MCPTT clients which are included in the group call request in step 1. The message contains the ad hoc group call indicator set.

In one example of Step 4, the receiving MCPTT clients are notified about the incoming ad hoc group call.

In one example of Step 5, the receiving MCPTT clients accept the group call requests and send group call responses to the MCPTT server.

In one example of Step 6, the MCPTT server sends the group call response to MCPTT client 1 102 through the signalling path to inform about successful call establishment.

In one example of Step 7, the MCPTT client 102, the client 106 and the client 108 establish media plane and floor control resources.

Use of Functional Alias as Target for Ad Hoc Group Call.

Usually, a particular functional alias may have been activated by more than one MCX users. An MCPTT user or an administrator or supervisor can make a call to all the MCPTT users who have activated a particular functional alias. They do not have to select the individual users and instead include the functional alias in the ad hoc group call request. The MCPTT server resolves the functional alias to the list of MCPTT IDs of the users who have activated the functional alias and forward the ad hoc group call request to those users. The MC Client may include more than one functional alias as a target of the ad hoc group call. The MC Client may include a combination of functional alias(es) and MCX Client IDs. The MCPTT server resolves accordingly and invite the target MCPTT users.

Figure 2:
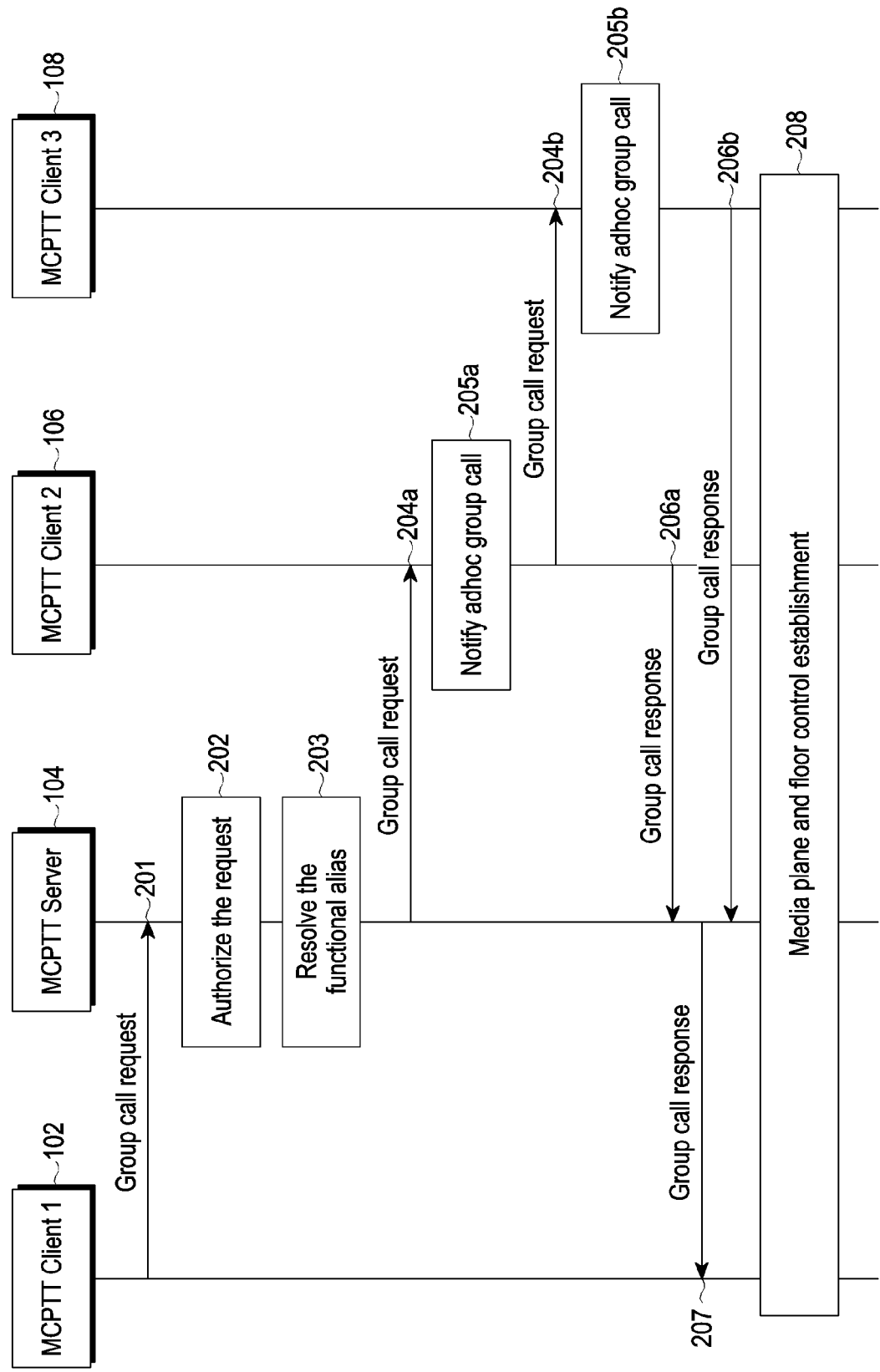
FIG. 2 illustrates an ad hoc group call procedure initiated by an authorized user specifying functional alias as a target according to embodiments of the present disclosure.

FIG. 2 illustrates the ad hoc group call procedure initiated by an authorized user specifying functional alias as target according to embodiments of the present disclosure.

The pre-conditions are as follows:
 MCPTT client 102, MCPTT Client 106 and MCPTT Client 108 has activated the functional alias that is being used; and
 A group ID to be used for the ad hoc group call is generated by the originating MCPTT client.

In one example of Step 1, MCPTT client 102 initiates the ad hoc group call by sending the group call request to the MCPTT server 104. This group call request contains the ad hoc group call indicator set and the functional alias as the target of the call.

In one example of Step 2, the MCPTT server 104 checks whether the MCPTT client 102 can initiate the ad hoc group call and can make call to the functional alias.

In one example of Step 3, the MCPTT server resolves the functional alias to the list of MCPTT IDs who have activated the functional alias.

In one example of Step 4, the MCPTT server sends the group call requests towards the MCPTT clients identifies as a result of step #3. The message contains the ad hoc group call indicator set.

In one example of Step 5, the receiving MCPTT clients are notified about the incoming ad hoc group call.

In one example of Step 6, the receiving MCPTT clients accepts the group call requests and send group call responses to the MCPTT server.

In one example of Step 7, the MCPTT server sends the group call response to the MCPTT client 102 through the signalling path to inform about successful call establishment.

In one example of Step 8, the MCPTT client 102, the client 106 and the client 108 establish media plane and floor control resources.

Inclusion of Mandatory Recipients as Part of Ad Hoc Group Call Recipients:

In some deployments, the MCPTT admin may configure that one or more participants mandatorily need to be present in any of the ad hoc group call being originated by the user. These participant or participants could be of the users with high priority; for example, a dispatcher, a supervisor etc., When this configuration is present, these participants need to be invited, even if they are not part of the users list provided in the group call request. Embodiments herein provide the following methods to achieve this.

MCPTT Client 102 Including the Mandatory Participants.

The MCPTT client 102, on sending the ad hoc group call request, automatically adds the mandatory participants into the request and the MCPTT server 104 invites them. If none of the mandatory participants accepts the call, the MCPTT server 104 terminates the ad hoc group call with appropriate reason code.

MCPTT Server 104 Including the Mandatory Participants.

In this case, on receiving the ad hoc group call request and if that request do not include the mandatory recipients as specified in the MCPTT user profile data document, the MCPTT server automatically sends the ad hoc group call request to the mandatory participants. If none of the participants accept the ad hoc group call request, MCPTT server terminates the ad hoc group call with proper reason code.

Conditions to Start Ad Hoc Group Call.

In some deployments, the following criteria can be included in the Group call request from the MCPTT client or the following criteria can be pre-configured:

As soon as the first participant accepts the invite;
As soon as a mandatory participant accepts the invite; and
As soon as X number of participants accept the invite.

Similarly, there can be conditions for terminating the ad hoc group call.

Off Network Ad Hoc Group Call Procedure.

The MC client is responsible for creating the group ID for the ad hoc group call being invoked. For example, a group may be a telecommunication team of a company XD and the telecommunication team may include a plurality of members and the MC client may create the group ID for the telecommunication team as "XD_telecommunication team_MCPTTClientID@XD.com." The MC client also supports assigning ProSe layer-2 group ID and multicast IP address for the ad hoc group being formed by the MC client for invoking an ad hoc group call. In an embodiment herein, the MC client can select the ProSe layer-2 group ID and multicast IP address based on the local configuration being provisioned. In an embodiment herein, the MC client can choose the ProSe layer-2 group ID and multicast IP address from the pool of ProSe layer-2 group IDs and multicast IP addresses which are configured in the MC client when they are in the coverage area or ProSe layer-2 group IDs and multicast IP addresses can be configured as part of MCPTT User profile data.

Embodiments herein use a dedicated PC5 channel to announce the mapping of ad hoc group ID, ProSe layer-2 group ID, list of ad hoc group call participants and multicast IP address to the MCPTT clients within the PC5 communication proximity. Whenever the ProSe layer on the MC UE receives the announcement on the dedicated channel, the UE checks whether it contains the User Info ID matching with its User Info ID provided by the MC client and pass it to the Application layer, otherwise the UE drops the announcement. Hence, only the MC clients whose MCPTT users are as part of the ad hoc group call announcement receives the mapping info.

Figure 3:
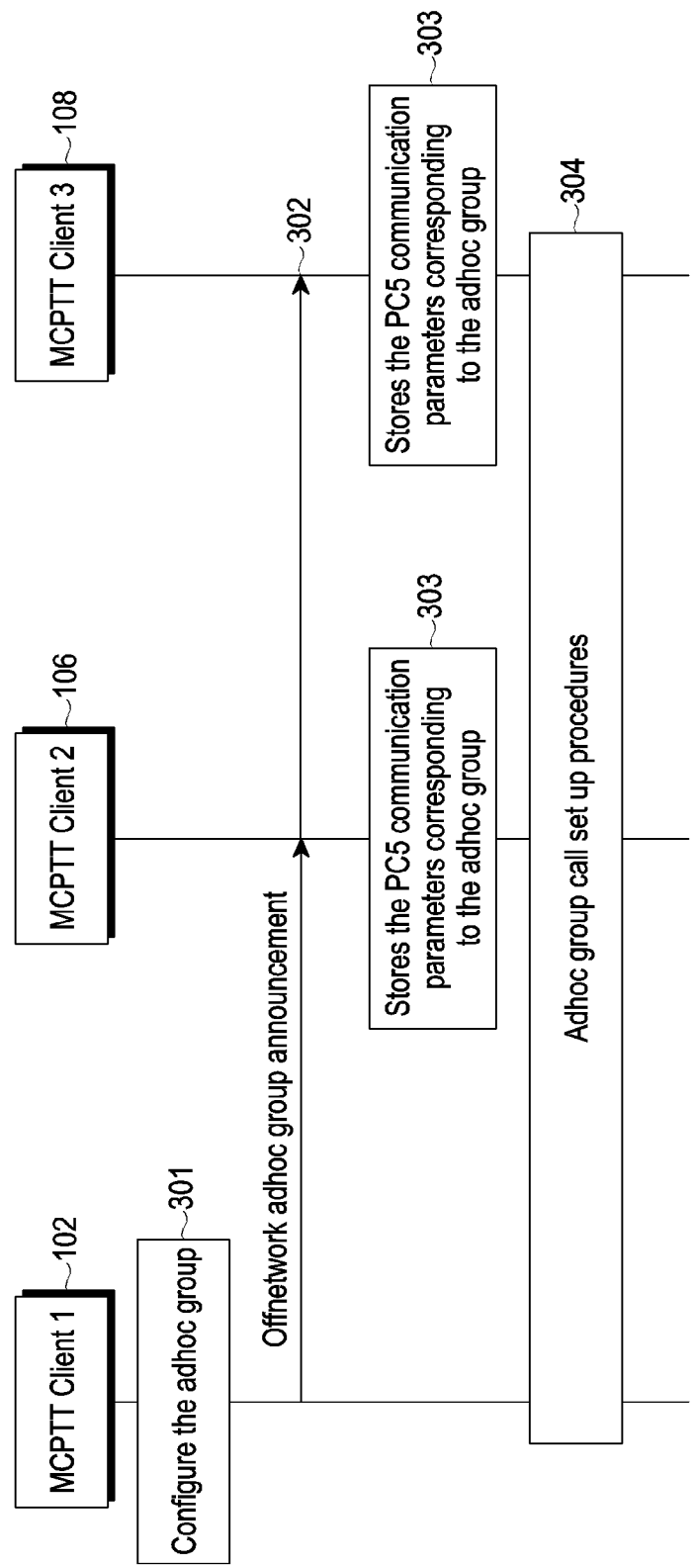
FIG. 3 illustrates a procedure for initiating an ad hoc group call in an off network according to embodiments of the present disclosure.

FIG. 3 illustrates the procedure of initiating ad hoc group call in off network according to various embodiments of the present disclosure.

In one example of Step 1, the MCPTT Client 102 generates the ProSe layer-2 group ID or chooses a ProSe layer-2 group ID from the pool of configured ProSe layer-2 group IDs.

In one example of Step 2, the MC client 102 further announces the ad hoc group information including the corresponding ProSe layer-2 group ID to the other MC clients within the PC5 communication proximity on a PC5 channel dedicated for announcing ad hoc group communication.

In one example of Step 3, the receiving MCPTT clients stores the PC5 communication parameters corresponding to the ad hoc group.

In one example of Step 4, originating MC client 102 invokes the ad hoc group call set up procedures in off network mode.

Alternatively, the originating client can announce the off network communication parameters required for ad hoc group call to all the participants individually if they are in the proximity.

The embodiments disclosed herein can be implemented through at least one software program running on at least one hardware device and performing network management functions to control the elements. The elements can be at least one of a hardware device, or a combination of hardware device and software module.

Figure 4:
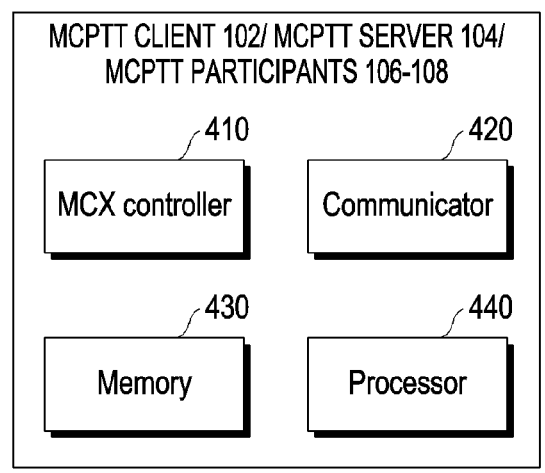
FIG. 4 illustrates hardware components of the MCPTT client/MCPTT server/MCPTT participants according to embodiments of the present disclosure.

FIG. 4 illustrates hardware components of the MCPTT client 102/MCPTT server 104/MCPTT participants 106-108 according to embodiments of the present disclosure. The system includes an MCPTT server, the MCPTT client 102, and the MCPTT participants 106-108. Each of the MCPTT server 104, the MCPTT client 102, and the MCPTT participants 106-108 includes a memory 430; at least one processor 440; a MCX controller 410 connected with the memory and the at least one processor is configured to: list a list of MCPTT participants or a functional alias to initiate an ad hoc group call in a MCX on network. The MCX controller is further configured to initiate the ad hoc group call with a list of MCPTT participants or the functional alias by sending a group call request to a MCPTT server. The MCX controller 410 is further configured to generate ad hoc group ID to be used for the ad hoc group call. The MCX controller 410 is further configured to receive a notification of an incoming ad hoc group call with the ad hoc group ID from the MCPTT server 104, wherein the incoming ad hoc group call is initiated by the MCPTT client. The MCX controller 410 is further configured to send group call responses to the MCPTT server for accepting the ad hoc group call. The MCX controller 410 is further configured to establishing, by the participating MCPTT clients 102, a media plane and at least one floor control resource to be used in the ad hoc group call.

In some embodiments, the MCX controller 410 is further configured to check whether the MCPTT client 102 can initiate the ad hoc group call, before sending the group call request to the MCPTT participants 106-108 based preset configuration parameters.

In some embodiments, the MCX controller 410 is further configured to automatically add at least one mandatory MCPTT participant into the ad hoc group request if the MCPTT participant 106-108 is defined in the preset configuration parameters. The MCX controller 410 is further configured to initiate the ad hoc call with the MCPTT participants 106-108 or the functional alias a MCX off network.

In some embodiments, the MCX controller 410 is further configured to select a ProSe layer-2 group ID from a pool of configured ProSe layer-2 group IDs, announce an ad hoc group information comprising corresponding ProSe layer-2 group ID to the MCPTT participants 106-108 or the functional alias within a PC5 communication of a PC5 channel dedicated for announcing ad hoc group communication, receive a PC5 communication parameters corresponding to the ad hoc group, and invoke the ad hoc group call set up procedures in off network mode. The MCPTT client 102, the MCPTT server 104, and the MCPTT participants 106-108 are configured with MCPTT configuration parameters.

Figure 5:
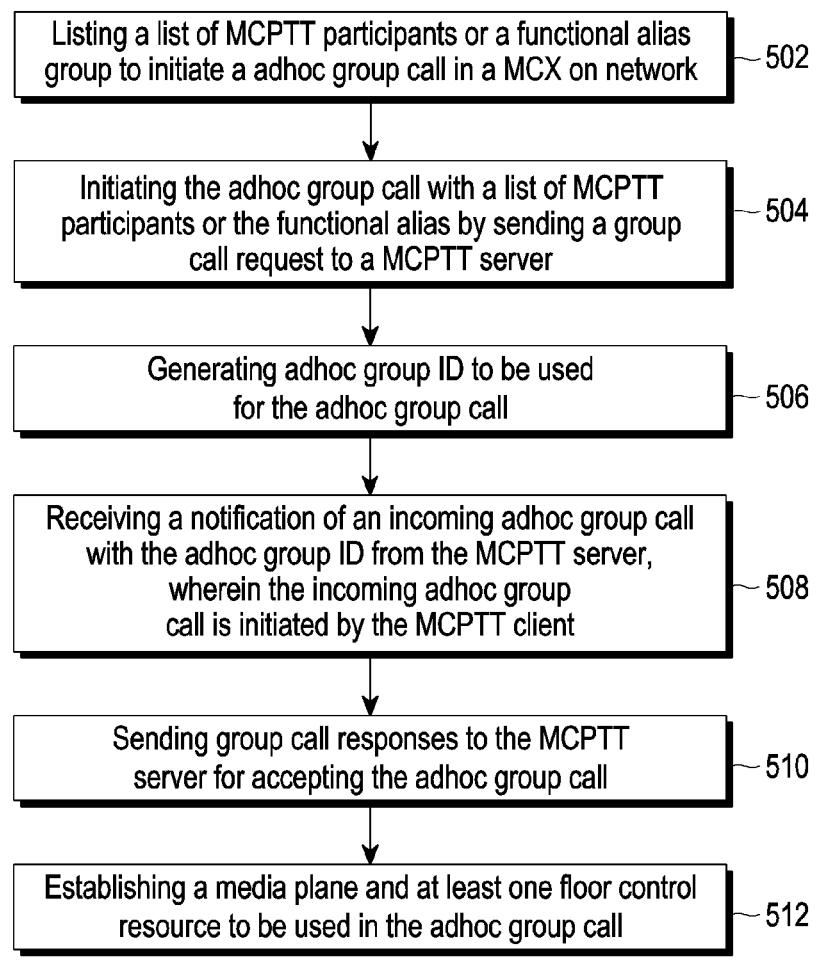
FIG. 5 illustrates a method for initiating an ad hoc group call in an off network according to embodiments of the present disclosure.

FIG. 5 illustrates the method of initiating ad hoc group call in off network, according to embodiments of the present disclosure. At step 502, method includes listing, by an MCPTT client, a list of MCPTT participants or a functional alias to initiate an ad hoc group call in a MCX on network. The method further includes initiating, by the MCPTT client, the ad hoc group call with a list of MCPTT participants or the functional alias by sending a group call request to a MCPTT server. At step 506, the method further includes generating, by the MCPTT client, ad hoc group ID to be used for the ad hoc group call. At step 508, the method further includes receiving, by the MCPTT participants, a notification of an incoming ad hoc group call with the ad hoc group ID from the MCPTT server. The incoming ad hoc group call is initiated by the MCPTT client 102. At step 510, the method includes sending, by the MCPTT participants, group call responses to the MCPTT server for accepting the ad hoc group call. At step 512, method includes establishing, by the participating MCPTT clients, a media plane and at least one floor control resource to be used in the ad hoc group call.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of at least one embodiment, those skilled in the art will recognize that the embodiments herein can be practiced with modification within the spirit and scope of the embodiments as described herein.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for providing ad hoc group calls by a mission critical push to talk (MCPTT) client in mission critical services (MCX), the method comprising:
    initiating an ad hoc group call by sending a group call request including a list of participants for the ad hoc group call to an MCPTT server;
    receiving a group call response based on successful call establishment of the ad hoc group call from the MCPTT server; and
    establishing a media plane and at least one floor control resource for the ad hoc group call.

2. The method as claimed in claim 1, wherein the group call request further includes at least one mandatory MCPTT participant for the ad hoc group call.

3. The method as claimed in claim 1, further comprising initiating the ad hoc group call with the participants for an off-network.

4. The method as claimed in claim 1, further comprising:
    selecting a ProSe layer-2 group ID from a pool of configured ProSe layer-2 group IDs;
    announcing ad hoc group information comprising the ProSe layer-2 group ID to the participants or a functional alias within a PC5 communication of a PC5 channel dedicated for announcing an ad hoc group communication;
    receiving a PC5 communication parameters corresponding to an ad hoc group; and
    invoking ad hoc group call set up procedures in an off-network mode.

5. The method as claimed in claim 1, wherein the MCPTT client, the MCPTT server, and the participants are configured with MCPTT configuration parameters required for supporting ad hoc group communication.

6. The method as claimed in claim 1, wherein the group call request further comprises at least one of:
    a MCPTT ID of the MCPTT client;
    a functional alias of the MCPTT client;
    a session description protocol (SDP) offer related to offered media parameters;
    an implicit floor request indicating that the MCPTT client requests a floor;
    a broadcast indicator indicating that the group call request is for a broadcast ad hoc group call;
    location information about the MCPTT client; or
    information indicating an application priority level requested for the ad hoc group call.

7. A mission critical push to talk (MCPTT) client for providing ad hoc group calls in mission critical services (MCX), the MCPTT client comprising:
    memory;
    at least one processor; and
    a controller operably coupled with the memory and the at least one processor, the controller configured to:
        initiate an ad hoc group call by sending a group call request including a list of participants for the ad hoc group call to an MCPTT server,
        receive a group call response based on successful call establishment of the ad hoc group call from the MCPTT server, and
        establish a media plane and at least one floor control resource for the ad hoc group call.

8. The MCPTT client as claimed in claim 7, wherein the group call request further includes at least one mandatory MCPTT participant into an ad hoc group call request.

9. The MCPTT client as claimed in claim 7, wherein the controller is further configured to initiate the ad hoc group call with the participants for an off-network.

10. The MCPTT client as claimed in claim 7, wherein the controller is further configured to:
    select a ProSe layer-2 group ID from a pool of configured ProSe layer-2 group IDs;
    announce ad hoc group information comprising the ProSe layer-2 group ID to the participants or a functional alias within a PC5 communication of a PC5 channel dedicated for announcing an ad hoc group communication;
    receive a PC5 communication parameters corresponding to an ad hoc group; and
    invoke ad hoc group call set up procedures in an off-network mode.

11. The MCPTT client as claimed in claim 7, wherein the MCPTT client, the MCPTT server, and the participants are configured with MCPTT configuration parameters required for supporting ad hoc group communication.

12. A method for providing ad hoc group calls by a mission critical push to talk (MCPTT) server in mission critical services (MCX), the method comprising:
    receiving a first group call request for an ad hoc group call from an MCPTT client, wherein a group call request includes a list of participants for the ad hoc group call;

transmitting a second group call request for the ad hoc group call to each of the participants for the ad hoc group call, wherein the second group call request includes an ad hoc group ID for the ad hoc group call; and receiving a group call response from each of the participants in response to the second group call request.

13. The method as claimed in claim 12, further comprising:
determining whether the MCPTT client initiates the ad hoc group call before sending the group call request to the participants based on preset configuration parameters.

14. The method as claimed in claim 12, further comprising:
adding at least one mandatory MCPTT participant into the first group call request based on preset configuration parameters when the mandatory MCPTT participant is not added by the MCPTT client.

15. The method as claimed in claim 12, further comprising:
resolving a functional alias into the list of the participants when receiving the first group call with the functional alias as a target and send the ad hoc group call request to the participants.

16. A mission critical push to talk (MCPTT) server for providing ad hoc group calls in mission critical services (MCX), the MCPTT server comprising:
memory;
at least one processor; and
a controller operably coupled with the memory and the at least one processor, the controller configured to:
receive a first group call request for an ad hoc group call from an MCPTT client, wherein a group call request includes a list of participants for the ad hoc group call,
transmitting a second group call request for the ad hoc group call to each of the participants for the ad hoc group call, wherein the second group call request includes an ad hoc group ID for the ad hoc group call, and
receive a group call response from each of the participants in response to the second group call request.

17. The MCPTT server as claimed in claim 16, wherein the controller is further configured to determine whether the MCPTT client initiates the ad hoc group call before sending the group call request to the participants based on preset configuration parameters.

18. The MCPTT server as claimed in claim 16, wherein the controller is further configured to add at least one mandatory MCPTT participant into the first group call request based on preset configuration parameters when the mandatory MCPTT participant is not added by the MCPTT client.

19. The MCPTT server as claimed in claim 16, wherein the controller is further configured to resolve a functional alias into the list of the participants when receiving the ad hoc group call with the functional alias as a target and send the ad hoc group call request to the participants.

* * * * *

UNITED STATES PATENT AND TRADEMARK OFFICE
CERTIFICATE OF CORRECTION

Page 1 of 1

PATENT NO. : 12,167,494 B2
APPLICATION NO. : 17/660537
DATED : December 10, 2024
INVENTOR(S) : Arunprasath Ramamoorthy et al.

It is certified that error appears in the above-identified patent and that said Letters Patent is hereby corrected as shown below:

On the Title Page

Column 1, Item (30) should read:
Apr. 26, 2021 (IN) ........................... 202141019166
Mar. 31, 2022 (IN) ........................... 202141019166

Signed and Sealed this
Eleventh Day of March, 2025

Coke Morgan Stewart
*Acting Director of the United States Patent and Trademark Office*